United States Patent [19]

Yamakage et al.

[11] 4,416,569

[45] Nov. 22, 1983

[54] TOOL POSITION COMPENSATING MECHANISM

[75] Inventors: Tetsuro Yamakage, Anjoh; Toshiharu Takashima, Chiryu, both of Japan

[73] Assignee: Toyoda Koki Kabushiki Kaisha, Kariya, Japan

[21] Appl. No.: 253,048

[22] Filed: Apr. 10, 1981

[30] Foreign Application Priority Data

Apr. 30, 1980 [JP] Japan .......................... 55-58203[U]

[51] Int. Cl.³ ...................... B23B 25/00; B23B 29/034
[52] U.S. Cl. ........................................ 408/4; 408/147; 408/161; 408/168; 408/171
[58] Field of Search ................... 408/150, 146, 4, 158, 408/159, 161, 162, 163, 164, 165, 166, 167, 168, 169, 170, 171, 172, 147

[56] References Cited

U.S. PATENT DOCUMENTS

| | | | |
|---|---|---|---|
| 955,180 | 4/1910 | Mason | 408/168 |
| 1,307,103 | 6/1919 | Wildey | 408/165 |
| 1,611,186 | 12/1926 | Habart | 408/164 |
| 2,556,372 | 6/1951 | Johnston et al. | 408/171 |
| 2,672,771 | 3/1954 | Rogers | 408/171 |
| 3,276,101 | 10/1966 | Plein | 408/171 |
| 3,344,693 | 10/1967 | Scholl | 408/181 |
| 3,530,745 | 9/1970 | Milewski | 408/158 |
| 3,664,755 | 5/1972 | Carns | 408/159 |
| 3,667,856 | 6/1972 | Walker | 408/146 |
| 3,740,161 | 6/1973 | Milewski | 408/171 |
| 3,827,823 | 8/1974 | Lhomme | 408/151 |
| 3,918,826 | 11/1975 | Friedline | 408/154 |
| 3,961,857 | 6/1976 | Koblesky | 408/150 |
| 4,055,386 | 10/1977 | Chynoweth et al. | 408/147 X |
| 4,097,180 | 6/1978 | Kwieraga | 408/169 |

FOREIGN PATENT DOCUMENTS

| | | | |
|---|---|---|---|
| 2257653 | 11/1972 | Fed. Rep. of Germany | 408/158 |
| 2405694 | 2/1974 | Fed. Rep. of Germany | 408/158 |
| 2839155 | 9/1978 | Fed. Rep. of Germany | 408/163 |
| 54-17179 | 7/1979 | Japan | 408/181 |
| 209179 | 7/1968 | U.S.S.R. | 408/159 |

*Primary Examiner*—William R. Briggs
*Assistant Examiner*—Thomas Kline
*Attorney, Agent, or Firm*—Oblon, Fisher, Spivak, McClelland & Maier

[57] ABSTRACT

A tool holder incorporating a tool position compensating mechanism which comprises a screw shaft rotatably supported in a tool mounting shell in axial alignment therewith and engageable with a stationary member on a machine tool for relative rotation with the mounting shell is disclosed. A sleeve is threadedly engaged with the screw shaft to be axially moved at the time of relative rotation between the mounting shell and the screw shaft. This sleeve, when axially moved, actuates a transmitting member, supported in the shell, by the wedge action of a cam surface formed thereon, so that a cutting blade support end of a tool secured on the mounting shell is bent to adjust the position of a cutting blade on the tool.

7 Claims, 4 Drawing Figures

TOOL POSITION COMPENSATING MECHANISM

BACKGROUND OF THE INVENTION

1. Field of the Invention

This invention relates in general to a tool holder for use on a numerically controlled machine tool. More particularly, it relates to such a tool holder which is capable of automatically adjusting or compensating the position of a cutting tool thereon by utilizing the rotation of a tool spindle receiving the tool holder.

2. Description of the Prior Art

Generally, boring tool holders, as used in numerically controlled boring machines, incorporate a tool position compensating mechanism therein. This compensating mechanism serves to adjust the position of a cutting tool, carried on the tool holder, in a radial direction thereof, so that it is possible either to machine bores of different diameters or to compensate the radial position of the tool for wear of the cutting edge of the tool.

One type of known tool holder incorporating such a tool position compensating mechanism receives an external sleeve at its circumferential surface, and tool position adjustment is performed by rotating the tool holder after rigidly holding the external sleeve by means of suitable rotation preventing means. However, the provision of the external sleeve disadvantageously causes the diameter of the tool holder to be increased, thus resulting in restrictions on the bores that can be machined by the use of the tool holder. The provision of the external sleeve further causes weight unbalance of the tool holder, thereby generating vibration during machining operations whereby the accuracy of bores machined by the use of the tool holder is degraded.

SUMMARY OF THE INVENTION

Accordingly, it is a primary object of the present invention to provide an improved tool holder with a tool position compensating mechanism which is not only of decreased diameter but also free from any weight unbalance.

Another object of the present invention is to provide an improved tool holder with a tool position compensating mechanism which is capable of making fine adjustment of tool position and which has a broadened range of tool position compensation.

Briefly, according to the present invention, there is provided a tool holder incorporating a tool position compensating mechanism, which comprises a screw shaft rotatably supported in a tool mounting shell in axial alignment with the axis of a shank receivable in a machine tool spindle. The mounting shell is integrally provided on the shank and fixedly carries a cutting tool, a cutting blade support end of which is bendable toward a radial outward direction of the mounting shell. The screw shaft is engageable with a stationary member provided on the machine tool for effecting relative rotation between the mounting shell and the screw shaft when the tool spindle is rotated. The mechanism further comprises a sleeve, which is received in the mounting shell for integral rotation therewith. This sleeve is threadedly engaged with the screw shaft for being axially moved at the time of relative rotation between the mounting shell and the screw shaft. A transmitting member is interposed between the back of the cutting blade support end of the tool and a cam surface, which is formed on the sleeve to be sloped along the axis of the shank. The member, when moved by the wedge action of the cam surface at the time of axial movement of the sleeve, pushes and bends the cutting blade support end of the tool toward the radial outward direction of the mounting shell, thereby resulting in tool position adjustment or compensation.

The tool holder according to the present invention can be decreased in its diameter and accordingly, is diminished in its size because of being free from any external sleeve as provided in the prior tool holder. The elimination of any radially protruding member from the tool holder advantageously prevents weight unbalance of the tool holder and avoids the resulting generation of vibration during machining operations. Further, the utilization of screw and wedge mechanisms in the tool position compensating mechanism permits a smaller adjusting amount of the tool position per rotation of the tool holder, thereby making fine adjustment of the tool position possible. Nevertheless, the adjusting range of the tool position can be broadened since it depends on the number of rotations of the tool holder.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, wherein like reference numerals designate like or corresponding parts throughout the several views, and wherein.

DETAILED DESCRIPTION OF THE PREFERRED EMBODIMENTS

Figure 1:
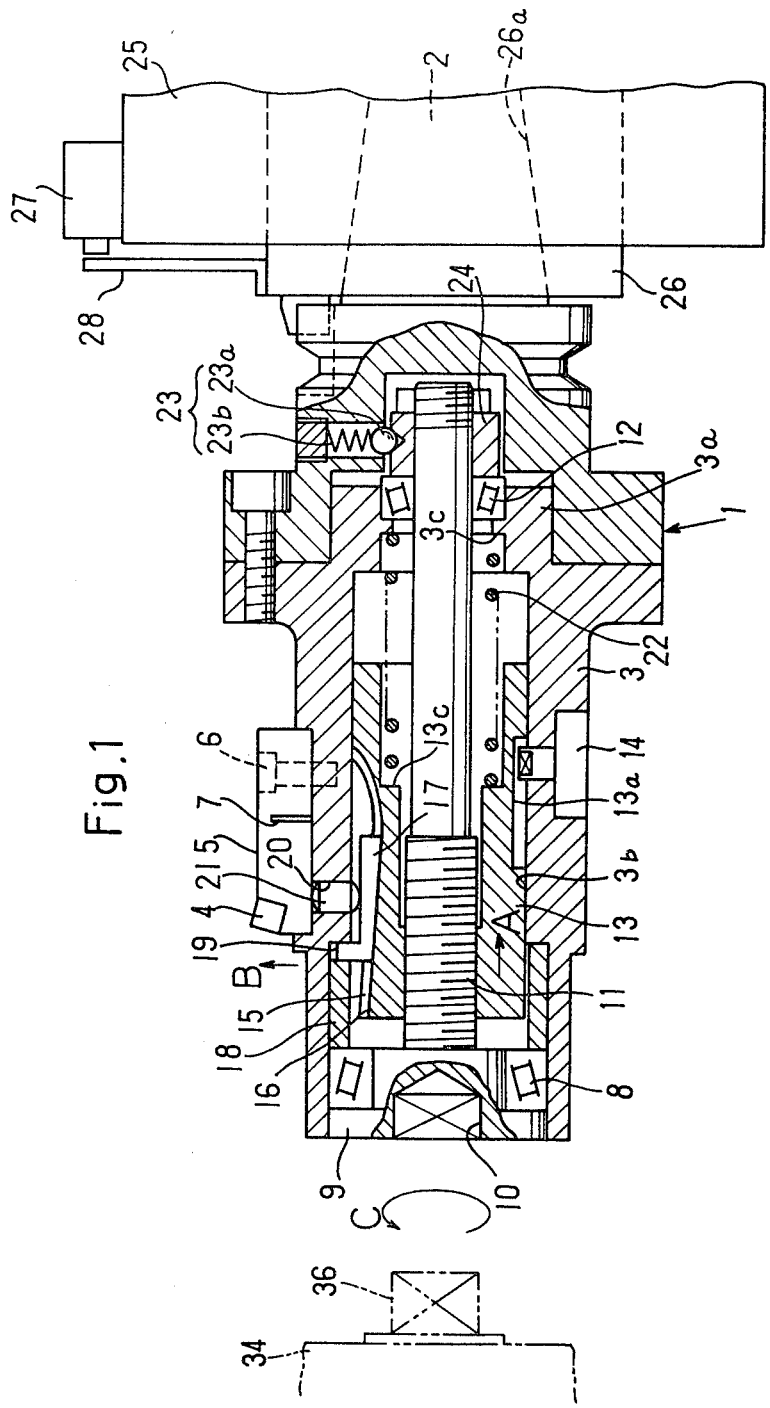
FIG. 1 is a cross sectional view of a tool holder incorporating a tool position adjusting mechanism according to the present invention.

Referring now to the drawings and particularly to FIG. 1 thereof, there is shown a tool holder 1 incorporating a tool position compensating mechanism according to the present invention. The tool holder 1 comprises a shank 2 and a tool mounting cylindrical shell 3, which is flangecoupled with a front end of the shank 2. The shell 3 is formed at its external mid portion with a tool mounting seat, on which one end of a cutting tool 5 having a cutting blade 4 at its other end (cutting blade support end) is fixed by means of a bolt 6. The tool 5 is formed at its mid portion with a slot 7 to facilitate the outward flexing or bending of the cutting blade support end of the tool 5.

A screw shaft 11 having a flange 9 at one end thereof is received in the mounting shell 3 in axial alignment with the axis of the shank 2. One end of the shaft 11 is carried by means of an antifriction bearing 8 at a front opening end of the mounting shell 3 for rotation about the axis of the tool holder 1. The flange 9 is formed with a square hole 10 at its center portion. The other end of the screw shaft 11 is rotatably carried by means of another anti-friction bearing 12 at a rear opening end 3a of the mounting shell 3 and is threadedly engaged with a nut (not numbered) to prevent the shaft 11 from axial movement. The screw shaft 11 is threadedly engaged with an internal screw hole of a sleeve 13, which is fitted into the cylindrical bore 36 of the mounting shell 3 for sliding movement therein. The sleeve 13 is prevented from rotation by the engagement of a key member 14, embedded in the external portion of the mounting shell 3, with an axially extended key way 13a formed on the external portion of the sleeve 13. Thus, the axial sliding movement of the sleeve 13 can be effected by the relative rotation between the screw shaft 11 and the mounting shell 3.

At the external portion of the sleeve 13 that circumferentially corresponds to the cutting tool 5, there is formed an axially extended guide slot 15, whose bottom surface takes the form of a cam surface 16. This cam surface 16 is sloped to ascend as it goes toward the front end of the sleeve 13, namely toward the flange 9. The guide slot 15 guides a slide piece 17 so as to establish friction engagement of the slide piece 17 with the cam surface 16. The slide piece 17 is so held by and between a collar 18 and an inner shoulder 19 of the mounting shell 3 that it is movable only in a radial direction of the sleeve 13. That is, the cam surface 16 of the sleeve 13 and the slide piece 17 constitute a wedge mechanism which converts the axial movement of the sleeve 13 into a radial movement of the slide piece 17. Further, the mounting shell 3 is formed with a radially extended through hole 20 at the position opening to the slide piece 17, as well as to the back of the cutting blade 4 of the cutting tool 5. The through hole 20 slidably retains a pin 21, which acts to transmit the radial movement of the slide piece 17, resulting from the movement of the cam surface 16, to the cutting tool 5 for position compensation of the cutting blade 4. A compression spring 22 is interposed between an inner shoulder 13c of the sleeve 13 and another inner shoulder 3c of the mounting shell 3 for eliminating the screw backlash between the screw shaft 11 and the sleeve 13. In order to prevent the rotation of the screw shaft 11 during machining operations, the shank 2 incorporates therein a detent mechanism 23, which comprises a collar 24 fixed on the screw shaft 11, a steel ball 23a engageable with a depression on the collar 24, and a compression spring 23b.

The tool holder 1 as constructed above, when used, is fixedly supported on a tool spindle 26 of a machine tool spindle head 25 by being inserted at the shank 2 into a tapered bore 26a of the tool spindle 26, and then by being rearwardly drawn by a known drawing mechanism (not shown) provided in the tool spindle 26. The spindle head 25 is fixedly provided with a proximity switch 27 for use in orientation of the tool spindle 26 to a predetermined angular position as well as in counting the number of tool spindle rotations, which represents a compensation amount of the tool 5. On the tool spindle 26, there is secured a dog plate 28, which acts to operate the proximity switch 27.

Figure 2:
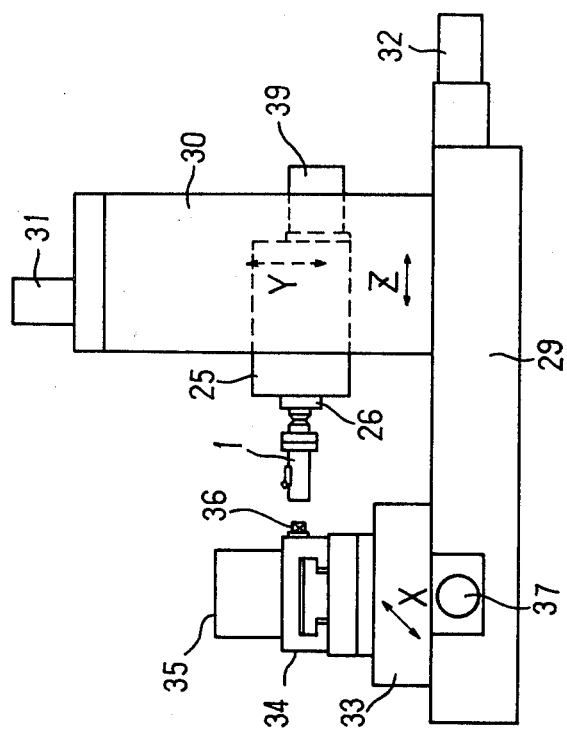
FIG. 2 is an explanatory view for explaining the tool position compensating operation of the tool holder, which operation is performed with the tool holder being received in a machine tool spindle.

As shown in FIG. 2, the spindle head 25 is mounted on a column 30 for sliding movement in a vertical Y-axis direction and is drivingly connected to a vertical feed motor 31 fixed on the top of the column 30. The column 30 is mounted on a bed 29 for sliding movement in a horizontal Z-axis direction and is drivingly connected to a horizontal feed motor 32 fixed on the bed 29. On the bed 29, and at the front side of the spindle head 25, a work table 33 is also mounted and is drivingly connected to a feed motor 37 fixed on the bed 29 for sliding movement in a horizontal X-axis direction orthogonal to the Z-axis direction (perpendicular to the plane of the Figure). Removably mounted on the work table 33 is a work pallet 34 carrying a workpiece 35. This pallet 34 has, protruded from a lateral side thereof opposite to the tool spindle 26, a square headed stationary member 36 insertable into the square hole 10 which is opened at the center portion of the flange 9 of the tool holder 1.

The operation of the device as constructed above will be described hereunder.

When the adjustment or compensation of the tool position is required either for a change in diameter of a bore to be machined, or for wear of the cutting edge of the blade 4, the tool spindle 26 is stopped at a predetermined angular position where the dog plate 28 faces the proximity switch 27. At the same time, the spindle head 25 and the work table 33 are moved to bring the axis of the tool holder 1 received in the tool spindle 26 in axial alignment with the axis of the stationary member 36 on the pallet 34. The column 30 is then advanced until the stationary member 36 is fit in the square hole 10 of the flange 9. This causes the pallet 34 to prevent the screw shaft 11 with the flange 9 from rotating. In this situation, when the tool spindle 26 is rotated by a drive motor 39 at a slower speed than ordinary cutting speeds, the mounting shell 3, together with the sleeve 13, are rotated about the screw shaft 11 in a direction as indicated by the arrow C in FIG. 1. This causes the sleeve 13 to slide in an axial rearward direction as indicated by the arrow A in FIG. 1, by the action of the screw 11. That is, the rotational movement of the tool holder 1 is converted into the straight sliding movement of the sleeve 13 in the direction of the arrow A. The sliding movement of the sleeve 13 is further converted by the action of the sloped cam surface 16 into the radially outward movement of the slide piece 17, as indicated by the arrow B in FIG. 1. Consequently, the cutting tool 5, which is engaged with the slide piece 17 through the pin 21, at the back of the cutting blade 4, receives a pushing force directed radially outwardly of the tool holder 1 and is bent at the slit 7 to extend the cutting blade 4 toward the radial outward direction of the tool holder 1. It should be noted herein that the radial outward extension amount of the blade 4 per one rotation of the tool holder 1 depends upon the pitch of the screw of the screw shaft 11. It should be also noted that since the number of rotations of the tool holder 1 has a proportional relationship with the extension amount of the cutting tool 5, exact positional compensation or adjustment can be attained by rotating the tool spindle 26 through the number of rotations which corresponds to a wear amount of the cutting blade 4. The number of rotations of the tool spindle 26 is counted by the signal that the proximity switch 27 generates upon actuation by the dog plate 28. It is apparent that the reverse rotations of the tool spindle 26 effect radial inward withdrawal of the cutting blade 4.

When the rotation of the spindle drive motor 39 is discontinued upon completion of tool position compensation, the tool spindle 26 is automatically stopped at the angular position where the dog plate 28 faces the proximity switch 27. At the same time, the steel ball 23a of the detent mechanism 23 is brought into engagement with the depression formed on the collar 24, whereby the screw shaft 11 is prevented from rotation relative to the tool holder 1 during subsequent cutting operations.

Figure 4:
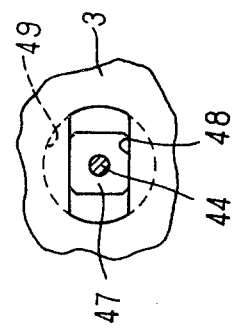
FIG. 4 is a fragmentary sectional view of another embodiment taken along the line IV—IV of FIG. 3.
Figure 3:
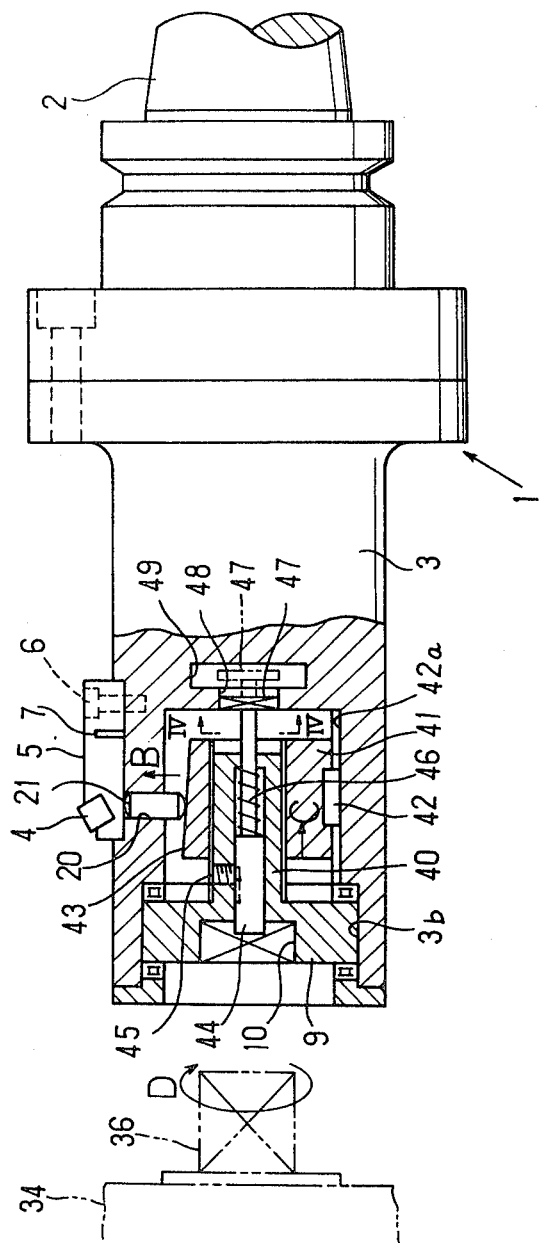
FIG. 3 is a plan view, partly in section, of another embodiment of the tool holder according to the present invention.

FIGS. 3 and 4 are illustrative of another embodiment of a tool holder according to the present invention wherein a compensating mechanism incorporated therein is simplified in construction. Description will be made hereunder with respect to the detail of the other embodiment.

Referring now to FIGS. 3 and 4, a flange 9 is received in a front opening end of a tool mounting cylindrical shell 3 forming a tool holder 1 and is rotatable about the axis of the tool holder 1. This flange 9 is formed at its outer end with a square hole 10 and, at its inner end, has protruded therefrom a screw shaft 40 in a co-axial alignment with the axis of the tool holder 1. The screw shaft 40 is threadedly engaged with a sleeve 41. This sleeve 41, although movable in an axial direction, is prevented from rotation by the engagement of a key 42, embedded in an external surface of the sleeve 41, with a key way 42a which is formed at an internal surface of the mounting shell 3 in parallel relation with the axis of the tool holder 1. At the external portion of the sleeve 41 that corresponds in circumferential location to a cutting tool 5 mounted on the external surface of the mounting shell 3, there is formed a cam surface 43, which is sloped to ascend as it goes toward the front end of the mounting shell 3. A radially extended through hole 20 is provided in the mounting shell 3 to face the sloped cam surface 43 at one end thereof and also to face the back of a cutting blade 4 of the tool 5 at the other end thereof. The through hole 20 has guided therein a pin 21, which is maintained in abutting engagement at opposite ends thereof with a cutting blade support end of the tool 5 and the sloped cam surface 43. Thus, when the axial movement of the sleeve 41 effects the axial movement of the pin 21 by wedge action, such movement of the pin 20 is transmitted to move the cutting blade 4 radially of the tool holder 1 for position compensation. A shifting shaft 44 is coaxially slidably received in the screw shaft 40. This shifting shaft 44 is prevented by a screw pin 45 from rotation relative to the screw shaft 40 and is urged by a compression spring 46 received in the screw shaft 40 to normally extend one end thereof within the square hole 10. The other end of the shifting shaft 44 is fixedly provided with a square piece 47. The axial bottom of the internal bore 3b in which the square piece 47 is located is formed, in a juxtaposed relation in the axial direction of the cylindrical shell 3, with an engaging slot 48 for engaging the square piece 47 and a round hole 49 for permitting the rotation of the square piece 47. Thus, the square piece 47 is usually engaged in the engaging slot 48 to prevent the relative rotation between the screw shaft 40 and the mounting shell 3 and at the time of the tool position compensating operation, is withdrawn into the round hole 49 to permit the relative rotation therebetween.

The operation of the other embodiment as constructed above will be described hereinafter.

The position compensating operation of the tool 5 is initiated by advancing the tool holder 1 along with the spindle head 25 so that the stationary member 36 is fully inserted into the square hole 10 of the flange 9. This prevents the screw shaft 40 from being rotated and also causes the shifting shaft 44 to be withdrawn against the force of the compression spring 46. Thus, the engaging piece 47 which has been engaged in the engaging slot 48 until now as indicated by the solid line in FIG. 3 is displaced to the withdrawn position as indicated by the phantom line in FIG. 3, to thereby permit the relative rotation between the screw shaft 40 and the mounting shell 3. When the tool spindle 26 is rotated together with the tool holder 1 in a direction as indicated by the arrow D in FIG. 3, the sleeve 41 is also rotated in the same direction, thereby being advanced by the action of the screw in a direction of the arrow C in FIG. 3. That is, the rotation of the tool holder 1 is converted into the straight movement of the sleeve 41 in the direction indicated by the arrow C. The straight movement of the sleeve 41 is further converted by the wedge action of the sloped cam surface 43 into the movement of the pin 21 in a radial outward direction of the mounting shell 3 indicated by the arrow B. Accordingly, the pin 21 pushes the blade support end of the tool 5, whereby the cutting blade 4 of the tool 5 is extended radially outwardly of the tool holder 1.

Upon completion of the tool position compensation, the tool spindle 26 is stopped at a predetermined angular position. Simultaneously, the retraction movement of the spindle head 25 is effected to disengage the square hole 10 of the flange 9 from the stationary member 36 of the pallet 34. The engaging piece 47, together with the shifting shaft 44, is returned by the force of the spring 46 to the original axial position as indicated by the solid line in FIG. 3 and, upon engagement with and in the engaging slot 48, prevents relative rotation between the screw shaft 40 and the sleeve 41.

The other embodiment now described with reference to FIGS. 3 and 4 has the advantages of a simplified tool position compensating mechanism and a smaller required axial space, in addition to the same advantages as the first embodiment has.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tool holder for use on a machine tool comprising:
a shank receivable in a tool spindle of said machine tool;
a tool mounting shell integrally provided on said shank and fixedly carrying a cutting tool including a cutting blade support end, said cutting blade support end being bendable toward a radially outward direction of said tool mounting shell;
a screw shaft rotatably supported in said tool mounting shell in axial alignment with the axis of said shank and provided with first positive drive means at an outer axial end thereof;
a sleeve received in said tool mounting shell and being rotatable therewith, said sleeve being threadedly engaged with said screw shaft for being axially moved when relative rotation between said tool mounting shell and said screw shaft is brought about, said sleeve being formed with a cam surface which is sloped along and relative to the axis of said tool shank; and
transmitting means interposed between said cutting tool and said cam surface of said sleeve for bending said cutting tool support end of said cutting tool toward said radial outward direction when moved by the wedge action of said cam surface at the time of axial movement of said sleeve;
said machine tool including:
a work table for mounting a workpiece thereon, said tool spindle and said work table being relatively movable with each other in first to third directions, said first to third directions being perpendicular to one another;

second positive drive means nonrotatably provided on said work table and engageable with said first positive drive means of said screw shaft;

feed means for effecting relative movement between said tool spindle and said work table in said first to third directions so as to bring said first positive drive means into engagement with said second positive drive means; and a spindle drive motor connected to said tool spindle for rotating said spindle, with said first and second positive drive means being engaged with each other, so as to effect said relative rotation between said tool mounting shell and said screw shaft.

2. A tool holder as set forth in claim 1, further comprising:

latch means provided between said screw shaft and one of said shank and said tool mounting shell for preventing rotation of said screw shaft relative to said sleeve during cutting operations.

3. A tool holder as set forth in claim 1 or 2, wherein said transmitting means comprises:

a slide piece maintained in contact with said cam surface of said sleeve and guided by said tool mounting shell for being moved by the wedge action of said cam surface in a radial direction of said screw shaft when said sleeve is axially moved; and a pin guided by said tool mounting shell between said slide piece and said cutting blade support end of said cutting tool for transmitting radial movement of said slide piece to said cutting blade support end of said cutting tool.

4. A tool holder as set forth in claim 2, wherein said latch means comprises:

a notched plate fixed on said screw shaft and formed with a notch at a circumferential surface thereof;

a ball guided by said shank for radial movement toward and away from said circumferential surface of said notched plate; and a spring retained by said shank for urging said ball toward said circumferential surface of said notched plate.

5. A tool holder as set forth in claim 4, further comprising:

a compression spring interposed between said tool mounting shell and said sleeve for eliminating screw back-lash of threaded engagement therebetween.

6. A tool holder as set forth in claim 1 or 2, wherein said transmitting means comprises:

a pin guided by said tool mounting shell in a radial direction of said screw shaft and engaged at opposite ends thereof with said cam surface of said sleeve and said cutting blade support end of said cutting tool for following said cam surface at the time of axial movement of said sleeve and bending said cutting blade support end.

7. A tool holder as set forth in claim 2, wherein said first positive drive means of said screw shaft includes an engaging hole drivingly engageable with said second positive drive means and wherein said latch means comprises:

a shifting shaft coaxially received in said screw shaft for axial movement relative thereto and being rotatable therewith, said shifting shaft being formed at one end thereof with an engaging piece which is engageable with an engaging slot formed on said tool mounting shell; and a compression spring interposed between said screw shaft and said shifting shaft for urging said shifting shaft in a direction such that the extension of the other end of said shifting shaft into said engaging hole and engagement of said engaging piece with said engaging slot are effected when said engaging hole of said screw shaft is disengaged from said second positive drive means.

* * * * *